2 Sheets--Sheet 1.
G. WOODS.
Reed Organs.
No. 5,909.
Reissued June 9, 1874.
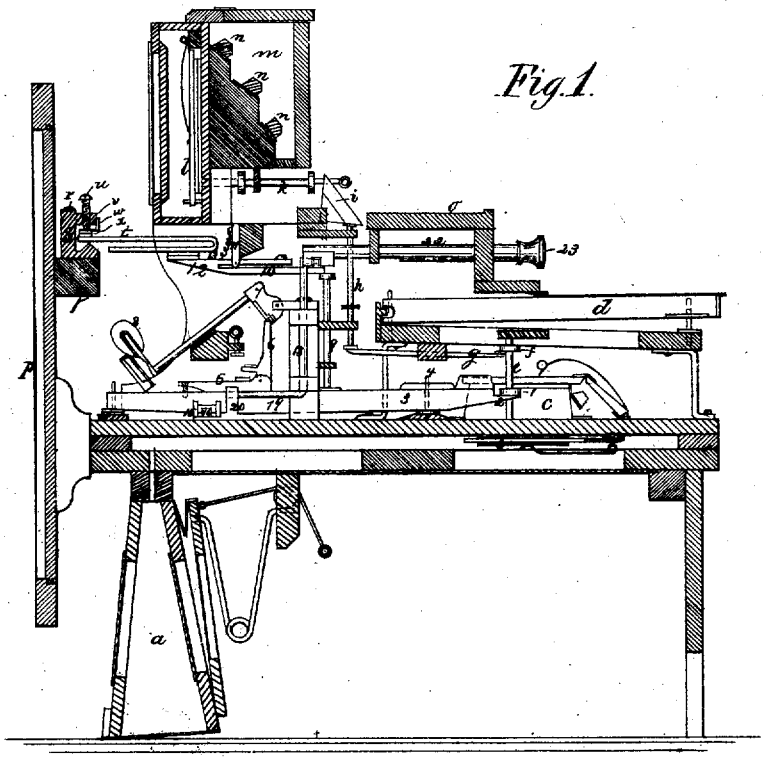
Witnesses:
George E. Phelps.
Horace M. Smoat
Inventor:
George Woods.
by Alban Andrew. atty.
AM. PHOTO-LITHOGRAPHIC Co. N. Y. (OSBORNE'S PROCESS.)

2 Sheets--Sheet 2.

G. WOODS.

Reed Organs.

Reissued June 9, 1874.

No. 5,909.

Witnesses:
George E. Phelps.
Horace M. Sprout

Inventor:
George Woods.
by Alban Andrén, atty

AM. PHOTO-LITHOGRAPHIC Co. N. Y. (OSBORNE'S PROCESS.)

UNITED STATES PATENT OFFICE.

GEORGE WOODS, OF CAMBRIDGEPORT, MASSACHUSETTS.

IMPROVEMENT IN REED-ORGANS.

Specification forming part of Letters Patent No. 134,830, dated January 14, 1873; reissue No. 5,909, dated June 9, 1874; application filed January 9, 1874.

*To all whom it may concern:*

Be it known that I, GEORGE WOODS, of Cambridgeport, in the county of Middlesex and State of Massachusetts, have invented certain new and useful Improvements in Reed-Organs; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates, first, to the combination, with a reed-organ, of vibratory metallic sounding hooks, forks or bars, plates, &c., secured firmly to a suitable rail, and actuated by means of hammers, and a piano-action in connection with the keys, whereby the advantage is obtained of having an organ and piano combined in the same instrument. In connection with such an improved instrument, I employ a suitable sounding-board, to which the vibration from the sounding hooks, bars, plates, &c., is conveyed. Secondly, my invention consists in an additional piano-stop, in combination with a reed-organ, by which the piano-action can be disconnected from the keys when not desired for action; and, lastly, in the general arrangement of the operating parts of a combined piano-action and reed-organ, as will herein be more fully shown and described.

Figure 3:
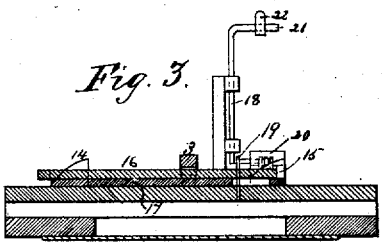
Figure 2:
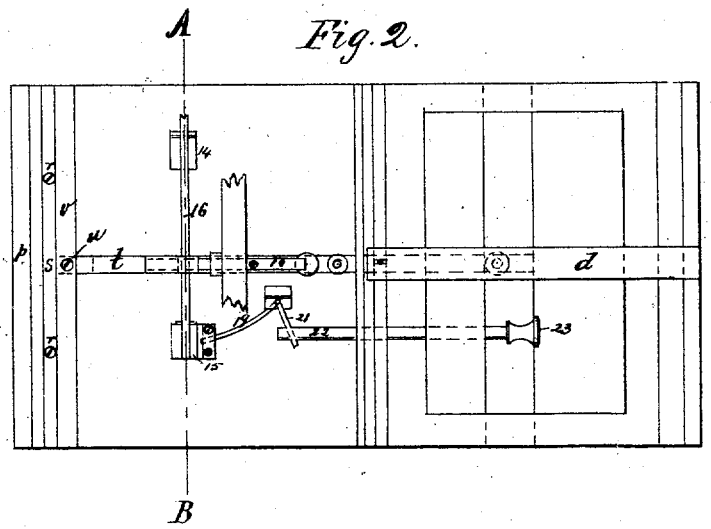

On the drawing, Figure 1 represents a sectional elevation of my combined reed-organ and piano; Fig. 2 is a ground plan; and Fig. 3 is a cross-section on the line A B, shown in Fig. 2.

Similar letters refer to similar parts wherever they occur on the different parts of the drawing.

The object of my invention is to produce an instrument consisting of a combined reed-organ and a piano. The piano combined with the organ consists of vibratory sounding hooks, forks, bars, or plates secured in one end to a suitable bridge or its equivalent, and is actuated by means of hammers operated by the ordinary keys that are used in reed-organs.

By this arrangement of a piano and an organ in one case, I am able to produce very beautiful tones in addition to the ordinary tones of the reeds.

On the drawing, I have shown the piano to consist of metallic hooks doubled up, as shown in Fig. 1; but I may also use perfectly-straight bars or plates secured in the same manner as shown in said figure, or the hooks may be made of any other form or shape, as may be required, to obtain the desired tones, and I wish distinctly to state that I do not confine myself to any one particular form or shape of the sounding hooks or bars employed; as my invention consists, mainly, in the combination, with a reed-organ, of a piano attachment, consisting of suitable sounding hooks, plates, or bars operated by the keys and actuated by means of hammers.

I am aware that organs have been made in connection with string-instruments, and I claim no invention as relates to the combination of an organ and a string-instrument, the gist of my invention being the combination of a reed-organ with sounding hooks, plates, or bars and a sounding-board.

To illustrate my invention I wish to refer to the drawings, on which *a* represents the bellows, arranged in the ordinary way, and *b* a valve that covers the passage from a reed placed in the reed-board *c*. The valve *b* is operated by means of the key *d* and rod *e* in the ordinary manner. On the rod *e* is a collar, *f*, that operates the rocking-lever *g*, the other end of which operates the vertical rod *h*, crank *i*, and horizontal valve-rod *k*, by which the valve *l* is actuated. The said valve *l* governs the inlet of the air from the additional reeds held in the solo-box *m*. *n n n* are stops for the different reeds, operated by means of suitable handles in the key-board *o*. *p* represents the sounding-board, to which is secured the cross-bar *q*, as shown. To the upper side of the said bar *q* is secured, by means of suitable screws *r r*, or in a similar manner, the grooved metallic rail *s*. The said metallic rail *s* is provided with a groove on its side, as shown in Fig. 1, in which is secured in a suitable manner metallic sounding-hook *t*, that is kept in place by means of the screw *u*, screwed through an upper projecting flange, *v*, and pressing against a metallic washer, *w*, between which and the end of the sounding-hook *t* is placed a small sheet of rubber, *x*, or other elastic material, as shown. The advantage of this arrangement is that each sounding hook or bar is adjusted independently of another, and that each hook or bar can be placed in position or replaced without disturbing the hooks on either side.

The piano-action is arranged and operated as follows: The operating-rod *e* for the valve *b* is also provided with a secondary collar, 1, resting upon the end 2 of the lever 3. The lever 3 is rocked on the fulcrum 4, and is, in its rear end, provided with the ordinary jack-and-lever arrangement 5 6, operating the butt 7, to which is attached the hammer 8. The hammer 8 is made to strike the sounding hook, fork, or bar *t* as soon as the key *d* is depressed, whereby a very agreeable piano sound is obtained, thus combining, with an ordinary reed-organ, the advantage of a piano in one and the same case. On the lever 3 rests the vertical rod 9, the upper end of which operates the damper-lever 10 around the fulcrum or flange 11, and relieves the damper 12 from the sounding hook or bar *t* as soon as the key *d* is depressed; but as soon as the pressure on the key *d* is removed, the damper 12 is immediately placed in contact with the sounding hook or plate *t* by the action of a small spring, 13, arranged as shown.

The additional piano-stop is arranged and carried out in the following manner: The lever 3 is raised upward in its rear end by means of the inclines 14 15, that operate pins on the bar 16 (Fig. 3) as soon as the inclines 14 15 are moved to the left, as seen in Fig. 3. The inclines 14 15 are connected together by means of a plate, 17, below the bar 16, and operated conjointly by means of the bent lever 18, the lower end 19 of which projects through a piece, 20, attached to the incline 15, and the upper end 21 is embraced and operated by means of the rod 22 and stop 23, as fully shown.

Having thus fully described the nature, construction, and operation of my invention, I wish to secure by Letters Patent and claim—

1. The combination, with a reed-organ, of vibratory hooks or bars, when firmly secured by one end only to a rail attached to a sounding-board and vibrated by hammers and a piano-action, for the purpose set forth.

2. In combination with a reed-organ, the piano-stop consisting of the rod 22, lever 18 19 21, slotted piece 20, inclines 14 15, and operating-rod 16, as and for the purpose set forth and shown.

In testimony that I claim the foregoing I have hereunto set my hand this 3d day of January, 1874.

GEORGE WOODS.

Witnesses:

ALBAN ANDRÉN,

GEORGE E. PHELPS.